(12) United States Patent
Morris

(10) Patent No.: US 11,021,995 B2
(45) Date of Patent: Jun. 1, 2021

(54) IMBALANCE DAMPING DEVICES FOR GAS TURBINE ENGINE FAN SHAFT BEARINGS

(71) Applicant: United Technologies Corporation, Farmington, CT (US)

(72) Inventor: Robert J. Morris, Portland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 185 days.

(21) Appl. No.: 16/055,704

(22) Filed: Aug. 6, 2018

(65) Prior Publication Data

US 2020/0040766 A1  Feb. 6, 2020

(51) Int. Cl.
| | |
|---|---|
| *F01D 25/16* | (2006.01) |
| *F02C 7/06* | (2006.01) |
| *F16F 7/01* | (2006.01) |
| *F16F 9/30* | (2006.01) |

(52) U.S. Cl.
CPC .............. *F01D 25/164* (2013.01); *F02C 7/06* (2013.01); *F16F 7/01* (2013.01); *F16F 9/30* (2013.01); *F05D 2240/50* (2013.01); *F16C 2360/23* (2013.01)

(58) Field of Classification Search
CPC ........ F01D 25/164; F01D 21/045; F02C 7/06; F16F 7/01; F16F 9/30; F16F 15/36; F16F 7/015; F05D 2240/50; F05D 2260/96; F16C 2360/23
See application file for complete search history.

(56) References Cited

U.S. PATENT DOCUMENTS

| | | | |
|---|---|---|---|
| 5,429,477 A | 7/1995 | Sikorski et al. | |
| 6,447,248 B1 * | 9/2002 | Kastl | F01D 21/045 384/535 |
| 6,494,679 B1 * | 12/2002 | Gadre | F01D 5/24 416/145 |
| 6,547,049 B1 * | 4/2003 | Tomlinson | F01D 25/04 188/379 |
| 8,147,191 B2 * | 4/2012 | Baumhauer | F01D 9/041 415/209.3 |
| 8,197,190 B2 * | 6/2012 | Garcin | F01D 17/16 156/73.6 |
| 8,262,353 B2 * | 9/2012 | Storace | F01D 25/164 416/2 |
| 9,512,874 B2 * | 12/2016 | Hennig | F16C 19/54 |
| 9,714,584 B2 | 7/2017 | Morris | |
| 2005/0220384 A1 | 10/2005 | Plona | |
| 2007/0012530 A1 | 1/2007 | Garcia | |

(Continued)

FOREIGN PATENT DOCUMENTS

| | | |
|---|---|---|
| EP | 1060970 A1 | 12/2000 |
| EP | 2065569 A2 | 6/2009 |

*Primary Examiner* — David E Sosnowski
*Assistant Examiner* — Danielle M. Christensen
(74) *Attorney, Agent, or Firm* — Carlson, Gaskey & Olds, P.C.

(57) ABSTRACT

A gas turbine engine includes a fan rotating with a fan shaft, a compressor and a turbine section. The turbine section includes a fan drive rotor driving the fan through the fan shaft. At least one bearing is between an inner static case and the fan shaft. The inner static case is cantilever mounted to static structure, and has a forward end spaced in a forward direction toward the fan rotor from a cantilever mount. A damping assembly is associated with the inner static case.

17 Claims, 1 Drawing Sheet

(56) References Cited

U.S. PATENT DOCUMENTS

| | | |
|---|---|---|
| 2009/0004000 A1 | 1/2009 | Baumhauer et al. |
| 2012/0024646 A1 | 2/2012 | Tsugihashi et al. |
| 2013/0022448 A1 | 1/2013 | Jadczak et al. |
| 2016/0097301 A1 | 4/2016 | Rosenau et al. |

* cited by examiner

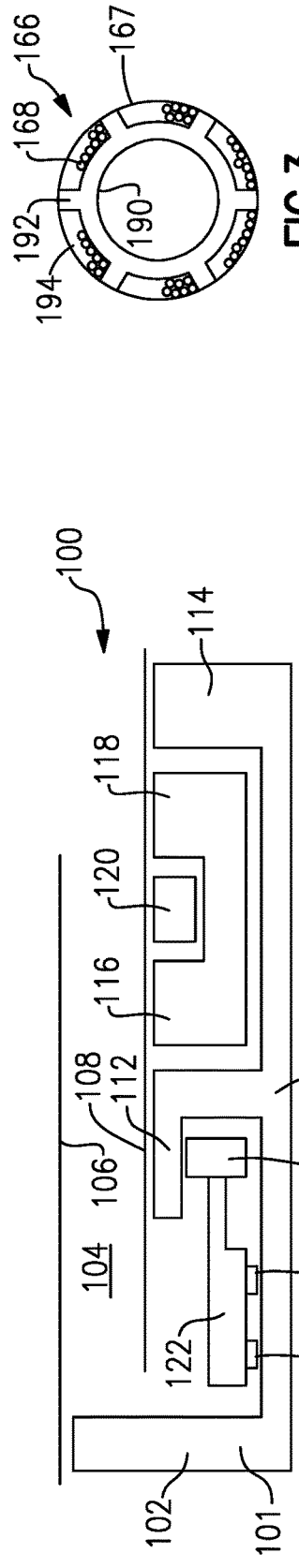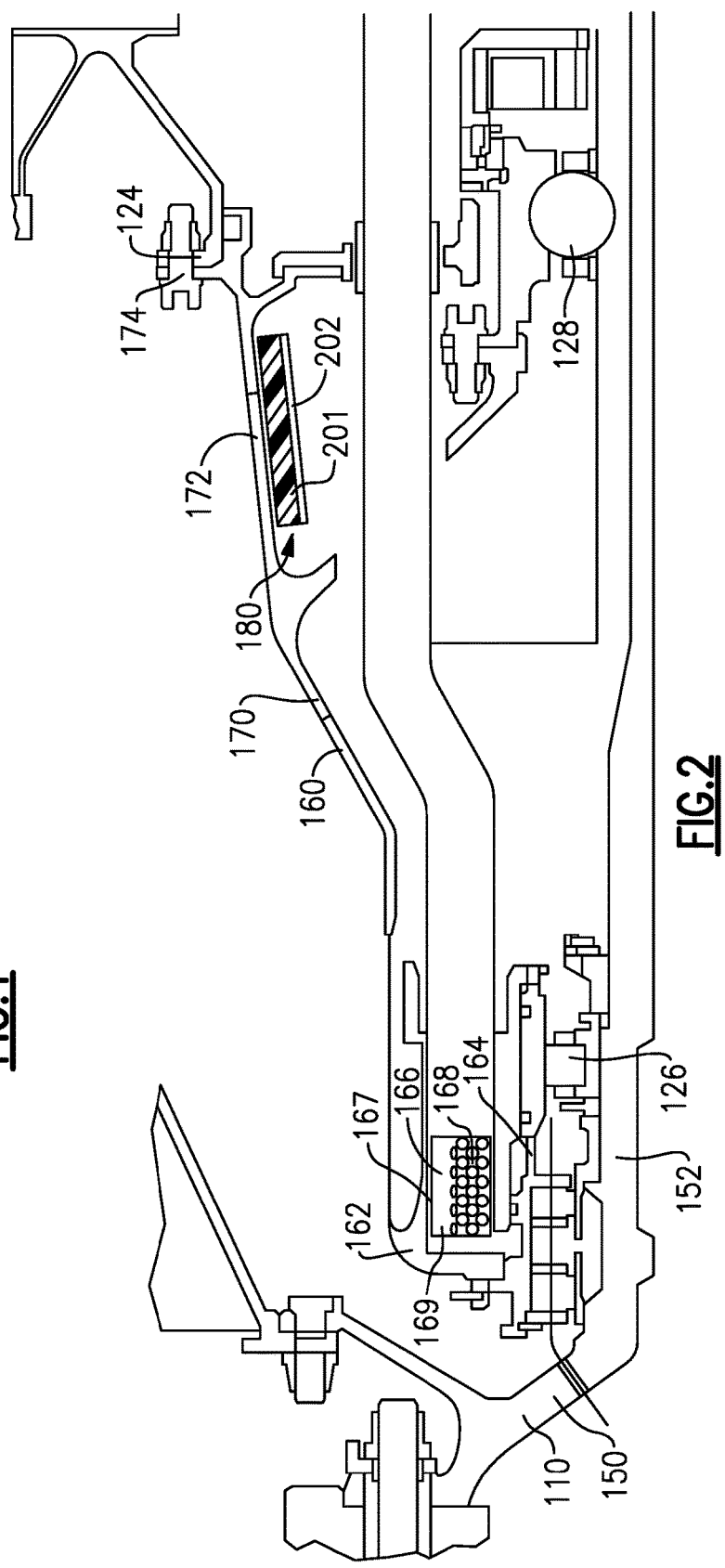

IMBALANCE DAMPING DEVICES FOR GAS TURBINE ENGINE FAN SHAFT BEARINGS

BACKGROUND

This application relates to damping structure for damping vibration of a bearing mount structure for a fan shaft in a gas turbine engine.

Gas turbine engines are known and typically include a fan delivering air into a bypass duct as propulsion air. The fan also delivers air to a compressor section where it is compressed. The air is then moved into a combustor where it is mixed with fuel and ignited. Products of this combustion pass downstream over turbine rotors, driving them to rotate.

Gas turbine engines, as mounted on aircraft, face many environmental challenges. As one example, ice can buildup on fan blades. The ice is not necessarily built up circumferentially uniformly, and it may also shed off of the blades in a non-uniform manner.

This can result in vibration of the fan rotor.

SUMMARY

In a featured embodiment, a gas turbine engine includes a fan rotating with a fan shaft, a compressor and a turbine section. The turbine section includes a fan drive rotor driving the fan through the fan shaft. At least one bearing is between an inner static case and the fan shaft. The inner static case is cantilever mounted to static structure, and has a forward end spaced in a forward direction toward the fan rotor from a cantilever mount. A damping assembly is associated with the inner static case.

In another embodiment according to the previous embodiment, a particle damper is positioned between the forward end of the intermediate case and a bearing support structure supporting the at least one bearing, with the particle damper being positioned radially intermediate the inner static case and the bearing support structure.

In another embodiment according to any of the previous embodiments, the particle damper includes a plurality of elements within a chamber, and air filling at least some percent of the chamber.

In another embodiment according to any of the previous embodiments, the air fills between 1% and 40% of a volume of the chamber.

In another embodiment according to any of the previous embodiments, the particles in the particle damper are at least one of metallic particles and a powder.

In another embodiment according to any of the previous embodiments, the particle damper includes a plurality of radially extending separating members separating the particle damper into a plurality of circumferentially spaced chambers each receiving the particles.

In another embodiment according to any of the previous embodiments, the damping assembly further includes an elastic damping member positioned adjacent a rear end of the inner static case and the cantilever mount.

In another embodiment according to any of the previous embodiments, a second bearing is positioned radially inwardly of the rear end of the inner static case and axially adjacent the cantilever mount, such that the elastic damping member is adjacent to the second bearing.

In another embodiment according to any of the previous embodiments, the second bearing is a thrust bearing.

In another embodiment according to any of the previous embodiments, the elastic damping member includes a viscoelastic material.

In another embodiment according to any of the previous embodiments, a constraining layer is positioned radially about the viscoelastic material.

In another embodiment according to any of the previous embodiments, the elastic damping member is positioned radially inward of the rear end of the inner static case.

In another embodiment according to any of the previous embodiments, the damping assembly includes an elastic damping member positioned adjacent a rear end of the inner static case and the cantilever mount.

In another embodiment according to any of the previous embodiments, the elastic damping member is positioned radially inward of the rear end of the inner static case.

In another embodiment according to any of the previous embodiments, the elastic damping member includes a viscoelastic material.

In another embodiment according to any of the previous embodiments, a constraining layer is positioned radially about the viscoelastic material.

In another embodiment according to any of the previous embodiments, the at least one bearing is positioned radially inwardly of the rear end of the inner static case and axially adjacent the cantilever mount, such that the elastic damping member is adjacent to the second bearing.

In another embodiment according to any of the previous embodiments, the second bearing is a thrust bearing.

In another embodiment according to any of the previous embodiments, the elastic damping member includes a viscoelastic material.

In another embodiment according to any of the previous embodiments, a constraining layer is positioned radially about the viscoelastic material.

These and other features may be best understood from the following drawings and specification.

BRIEF DESCRIPTION OF THE DRAWINGS

FIG. 1 schematically shows a gas turbine engine.
FIG. 2 shows a detail of a fan shaft mount.
FIG. 3 shows a detail of a first damper feature.

DETAILED DESCRIPTION

An engine 100 is schematically illustrated in FIG. 1. A fan rotor 101 rotates with a plurality of blades 102. The blades deliver air into a bypass duct 104 inwardly of a fan case 106 and outwardly of a core engine casing 108.

The fan rotor 101 is driven by a fan shaft 110. A low pressure compressor 112 is shown schematically and may rotate with the shaft 110. A low pressure turbine 114 may drive the fan shaft 110 and, hence, compressor 112 and fan rotor 101.

A high pressure compressor 116 may rotate with a high pressure turbine 118. A combustor 120 may be positioned intermediate the compressor 116 and turbine 118.

An inner casing 122 is shown having a cantilever mount to support structure 124. Bearings 126 and 128 provide support for the fan shaft 110 and are mounted on the inner static case 122.

As mentioned above, if ice builds up on the blades 102 and, in particular, builds up in a non-uniform manner, vibration may be passed into the fan rotor 101 and shaft 110. This can prove problematic, as it can result in displacement of the bearings, which, in turn, results in displacement of the inner case 122. In addition, there is a good deal of strain seen adjacent the cantilever mount 124.

FIG. 2 shows features to respond to the displacement and strain. As shown, the fan shaft 110 has a radially inwardly extending portion 150 extending to an axially rearwardly extending portion 152. The bearing 126 supports the straight portion 152.

The intermediate case, as shown in FIG. 2, actually includes a cantilever mounted portion 160. Cantilever mounted portion 160 has a forward end 162 including bearing mount structure 164 supporting the bearing 126.

A damper 166 is positioned intermediate structure 164 and forward end 162. As displacement occurs, the displacement will be transferred in the damper structure 166.

Damper structure 166 has an outer casing 167 and a plurality of particles 168. Air, as shown at 169, fill some of the chamber within the damper 166 to allow the particles room to move. Damper 166 may be called a particle damper.

The air 169 preferably fills a percentage of the overall volume of the damper 166. In embodiments, the air may fill between 1% and 40%. In narrower embodiments, the air may fill between 10% and 20%.

The particles may be metallic, may be powders, or may be structure such as short peening particles. Such particle dampers are known at other locations. However, they have not been utilized at the particular illustrated location.

The mount 160 extends rearwardly from forward portion 162 to a radially outwardly extending portion 170 and finally to a rear end 172, which is shown bolted at 174 to the static structure 124. This is the cantilevered mount.

The maximum displacement occurs adjacent the forward end 162. The maximum strain occurs adjacent the rear end 172 and at the location of the cantilever mount.

As such, an elastic damper material 180 is provided as a cylindrical structure radially inwardly of the rear end 172. This structure may be of viscoelastic material 201 and may have a constraining outer layer, such as a foil outer layer 202. Generally, such materials have a rubbery consistency. One particular known viscoelastic material is available from 3M Company as damping tape, and under the tradename 3M™ Vibration Damping Tape.

As also shown, the bearing 128 is associated with the rearward end 172. Bearing 128 is a thrust bearing.

FIG. 3 shows a detail of the damping particle chamber 166. An inner core structure 190 may have a plurality of radially outwardly extending legs 192 to separate the volume into a plurality of discrete chambers 194. As can be appreciated, the particles will fall under the effective gravity to a lower location and by defining a plurality of chambers 194. This arrangement ensures particles are generally dispersed about the entire circumference of the particle damper 166.

The percentages of air, as set forth above, are defined only taken into account the volume of the chambers 194 in this embodiment.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a fan rotating with a fan shaft, a compressor and a turbine section, said turbine section including a fan drive rotor driving said fan through said fan shaft;
at least one bearing between an inner static case and said fan shaft, and said inner static case being cantilever mounted to static structure, and having a forward end spaced in a forward direction toward said fan from a cantilever mount, and there being a damping assembly associated with said inner static case;
said damping assembly includes a particle damper positioned between said forward end of said inner static case and a bearing support structure supporting said at least one bearing, with said particle damper being positioned radially intermediate said inner static case and said bearing support structure;
said particle damper includes a plurality of elements within a chamber, and air filling at least some percent of said chamber;
wherein said particle damper includes a plurality of radially extending separating members separating said particle damper into a plurality of circumferentially spaced chambers each receiving said particles; and
wherein said damping assembly further includes an elastic damping member positioned adjacent a rear end of said inner static case and said cantilever mount.

2. The gas turbine engine as set forth in claim 1, wherein said air fills between 1% and 40% of a volume of said chamber.

3. The gas turbine engine as set forth in claim 2, wherein said particles in said particle damper are at least one of metallic particles and a powder.

4. The gas turbine engine as set forth in claim 1, wherein said elastic damping member is positioned radially inward of said rear end of said inner static case.

5. The gas turbine engine as set forth in claim 1, wherein said elastic damping member includes a viscoelastic material.

6. The gas turbine engine as set forth in claim 5, wherein a constraining layer is positioned radially about said viscoelastic material.

7. The gas turbine engine as set forth in claim 1, wherein a second bearing is positioned radially inwardly of said rear end of said inner static case and axially adjacent said cantilever mount, such that said elastic damping member is adjacent to said second bearing.

8. The gas turbine engine as set forth in claim 7, wherein said second bearing is a thrust bearing.

9. The gas turbine engine as set forth in claim 8, wherein said elastic damping member includes a viscoelastic material.

10. The gas turbine engine as set forth in claim 9, wherein a constraining layer is positioned radially about said viscoelastic material.

11. A gas turbine engine comprising:
a fan rotating with a fan shaft, a compressor and a turbine section, said turbine section including a fan drive rotor driving said fan through said fan shaft;
at least one bearing between an inner static case and said fan shaft, and said inner static case being cantilever mounted to static structure, and having a forward end spaced in a forward direction toward said fan from a cantilever mount, and there being a damping assembly associated with said inner static case;
wherein said damping assembly includes a particle damper is positioned between said forward end of said inner static case and a bearing support structure supporting said at least one bearing, with said particle damper being positioned radially intermediate said inner static case and said bearing support structure;
wherein said particle damper includes a plurality of elements within a chamber, and air filling at least some percent of said chamber;

wherein said particles in said particle damper are at least one of metallic particles and a powder;

wherein said particle damper includes a plurality of radially extending separating members separating said particle damper into a plurality of circumferentially spaced chambers each receiving said particles; and wherein said damping assembly further includes an elastic damping member positioned adjacent a rear end of said inner static case and said cantilever mount.

12. The gas turbine engine as set forth in claim 11, wherein a second bearing is positioned radially inwardly of said rear end of said inner static case and axially adjacent said cantilever mount, such that said elastic damping member is adjacent to said second bearing.

13. The gas turbine engine as set forth in claim 12, wherein said second bearing is a thrust bearing.

14. The gas turbine engine as set forth in claim 13, wherein said elastic damping member includes a viscoelastic material.

15. The gas turbine engine as set forth in claim 14, wherein a constraining layer is positioned radially about said viscoelastic material.

16. The gas turbine engine as set forth in claim 15, wherein said elastic damping member is positioned radially inward of said rear end of said inner static case.

17. A gas turbine engine comprising:

a fan rotating with a fan shaft, a compressor and a turbine section, said turbine section including a fan drive rotor driving said fan through said fan shaft;

at least one bearing between an inner static case and said fan shaft, and said inner static case being cantilever mounted to static structure, and having a forward end spaced in a forward direction toward said fan from a cantilever mount, and there being a damping assembly associated with said inner static case;

wherein said damping assembly includes a particle damper positioned between said forward end of said inner static case and a bearing support structure supporting said at least one bearing, with said particle damper being positioned radially intermediate said inner static case and said bearing support structure;

wherein said particle damper includes a plurality of elements within a chamber, and air filling at least some percent of said chamber; and wherein said damping assembly further includes an elastic damping member positioned adjacent a rear end of said inner static case and said cantilever mount.

* * * * *